United States Patent [19]

Leu

[11] Patent Number: 5,309,348
[45] Date of Patent: May 3, 1994

[54] METHOD AND APPARATUS FOR PREVENTING IMPROPER SWITCHING OF A DUAL POWER SUPPLY

[75] Inventor: Fang-Jye Leu, Taipei, Taiwan

[73] Assignee: Acer Peripherals, Inc., Taoyuan, Taiwan

[21] Appl. No.: 929,093

[22] Filed: Aug. 13, 1992

[51] Int. Cl.$^5$ ............................................. H02M 3/335
[52] U.S. Cl. ........................................ 363/71; 363/21; 363/97
[58] Field of Search ................. 363/20, 21, 65, 71, 363/72, 97, 131

[56] References Cited

U.S. PATENT DOCUMENTS

| | | | |
|---|---|---|---|
| 4,648,020 | 3/1987 | Vinciarelli | 363/97 |
| 5,130,561 | 7/1992 | Elliott | 363/72 |
| 5,161,241 | 11/1992 | Kanai | 363/65 |
| 5,189,599 | 2/1993 | Messman | 363/21 |

OTHER PUBLICATIONS

Data Sheet "Linear Integrated Circuits Current Mode PWM Controller" Unitrode, Feb. 1986, Rev. A, pp. 3-107-3-112.

*Primary Examiner*—Jeffrey Sterrett
*Attorney, Agent, or Firm*—Townsend and Townsend Khourie and Crew

[57] ABSTRACT

The present invention provides a dual switching power supply system that is immune to malfunction caused by the off noises of the switch control signals. The dual switching power supply system of the invention generates stable voltage outputs without the necessity of making any difficult and unsatisfactory adjustment in the PCB layout process. The dual switching power supply system of the invention preferably comprises: a first switch control means for outputting a first switch control signal; a second switch control means for outputting a second switch control signal; and a phase shifting means for shifting the phase of the second switch control signal by a predetermined amount while keeping the frequencies of the first and switch control signal equal.

13 Claims, 6 Drawing Sheets

METHOD AND APPARATUS FOR PREVENTING IMPROPER SWITCHING OF A DUAL POWER SUPPLY

BACKGROUND OF THE INVENTION

1. Field of the Invention

The present invention relates generally to a dual switching power supply system free from any malfunction caused by coupling of the off noise of the voltage sensing signal in one switching power supply to the voltage sensing signal in the other switching power supply.

2. Description of the Prior Art

A dual switching power supply (SPS) system is primarily useful in a circuit that needs a variable voltage output. For example, in a multi-frequency monitor, the voltage required for different frequencies can vary from 60 volts to 150 volts. A set of power supplies with an extra control circuit may solve this problem, but this results in occupying more space and lower efficiency. Therefore a dual switching power supply system is utilized to overcome these disadvantages. This kind of system usually uses a current mode circuit with two SPSs and the two SPSs have to work at the same frequency to avoid interference. The two switch control signals in the two SPSs are on/off square waves. When they are in-phase and are working at the same frequency, the off noise of the voltage sensing signal with a shorter on-time (the time period when signal is "high") may disturb the voltage sensing signal with a longer on-time to an extent that the DC output voltage signal of the dual SPS system has severe ripples and causes instability. Such a phenomenon is found to be most obvious in the applications to monitor circuits because of the display of distorted pictures on the screen.

FIG. 1 shows a typical current mode dual switching power supply system for a monitor circuit. The frequencies of the two SPSs have to be the same as the horizontal synchronization (h-sync) signal of the monitor or the overall system will contain interference. The system includes at least two current mode control integrated circuits (IC) CON1 and CON2. Commercially available UC3842 of Unitrode Co. is an example of such an IC. Please refer to FIG. 2 for the waveforms and timing relations of the signals mentioned below. The width of the h-sync pulses is exaggerated and the signal is assumed to be an ideal square wave for easier understanding. The input AC voltage passes through a full-wave bridge rectifier RF, a high capacitance capacitor $C_{h1}$ and then the transformer X1 to provide the desired level of output DC voltage. CON1 generates a control signal to control the on/off of the NMOS transistor Q1 which works as a switch. After CON1 is activated, capacitor $C_{11}$ is charged up in a rate decided by the values of $C_{11}$ and R1. Meanwhile, signal 111 at one end of $C_{11}$ is detected by CON1 through pin #4 to see whether it is greater than a predetermined value $V_{sense1}$. If so, the internal circuit of CON1 automatically lowers the voltage of signal 111 to zero, then $C_{11}$ is charged up again and signal 111 starts a next cycle. Thus signal 111 is an oscillating saw wave. The input synchronization triggering signal h-sync from the monitor carries a square pulse passing through a filtering diode D1 and a differentiating capacitor $C_{12}$, and results in an impulse signal 112 at the rising edge of the h-sync signal at node $N_1$. The impulse adds to signal 111 and forces the voltage of signal 111 to exceed $V_{sense1}$. When this happens, the voltage of signal 111 drops to zero right away and starts another cycle. Thus synchronizes signal 111 with the h-sync signal.

The gate terminal $G_1$ of NMOS transistor Q1 is connected to pin #6 of CON1 to receive the switch control signal 113. Under the control of CON1, signal 113 goes to "high" when signal 111 falls to zero voltage. This turns on the transistor Q1 and the current passing through resister $R_{s1}$ increases gradually because of the inductance of the coils of the transformer X1. The source terminal $S_1$ of the NMOS transistor Q1, which is also the voltage sensing terminal, is connected to pin #3 of CON1. The voltage at $S_1$, which is signal 114 in FIG. 2, is checked by CON1 to determine whether it is higher than a predetermined value $V_{sense2}$. If so, the control IC CON1 turns off Q1 by dropping the voltage of signal 113 and the voltage at $S_1$ to zero. Signals 111, 113 and 114 stay at zero voltage as the h-sync signal remains "low". The next cycle starts when the h-sync signal goes to "high" again. Therefore the frequencies of the switch control signal 113 and the voltage sensing signal 114 equal the frequency of the h-sync signal and the synchronization between the monitor and SPS1 is achieved.

Considering SPS2 at the bottom of FIG. 1, we can see that it is the same as SPS1 and receives the same h-sync signal for synchronization purpose. As a result, the switch control signal 123 at pin #6 of the control IC CON2 has the same frequency and phase as the switch control signal 113 and the h-sync signal from the monitor. Thus the synchronization process between the monitor, SPS1 and SPS2 is complete.

However, because of probable different loading requirements for the two SPSs, the two switch control signals at the two gate terminals, i.e. signal 113 and 123, may have a different duration of on-times. For convenience, assume that the on-time of signal 113 is shorter than that of signal 123 as shown in FIG. 2. The switching and state changing of the NMOS transistors and the transformers induce noise in the transient states of the two voltage sensing signals. Due to ground and other wiring on the printed circuit board (PCB), noise of one voltage sensing signal couples to the other voltage sensing signal. This can be observed from FIG. 2. Because the two on times are not of equal duration, the off noise of signal 114 couples onto the slope portion of signal 124 and, depending on the amplitude of the noise and the difference between the duration of two on-times, it may push the voltage of signal 124 to a level higher than $V_{sense2}$ and force signal 123 to go "low" before the moment it is designed to if noise is not present. This turns off the NMOS transistor Q2 prematurely and causes the output of the power supply system to be unstable. Prior art solutions to this problem include reducing the amplitude of the off noise and better PCB layout processing. However, difficulties still exist and the result may not be satisfactory even when great care is exercised.

SUMMARY OF THE INVENTION

It is therefore an object of the invention to provide a dual switching power supply system and method of providing a switch control signal which generate stable voltage outputs free from any malfunction due to the off noise of the switch control signals. It is also an object of the invention to produce stable voltage outputs with no necessity of making difficult and unsatisfactory adjustments in the PCB layout process.

The dual switching power supply system of the invention preferably comprises: a first switch control means for outputting a first switch control signal; a second switch control means for outputting a second switch control signal; and a phase shifting means for shifting the phase of the second switch control signal by a predetermined amount while keeping the frequencies of the first and second switch control signal equal to each other. Further understanding of the nature and advantages of the invention can be realized with reference to the Description of the Preferred Embodiments and the attached drawings.

DESCRIPTION OF THE PREFERRED EMBODIMENTS

The basic concept of the invention is to make the two switch control signals out-of-phase so that the switch control signal with a longer duration of on-time is at low voltage when the switch control signal with a shorter duration of on-time is on the edge of turning off. Thus, the off noise of the switch sensing signal with a shorter on-time can not make the voltage of the switch sensing signal with a longer on-time exceed the voltage limit erroneously and of the switch can not turn off at the wrong time.

Figure 1:
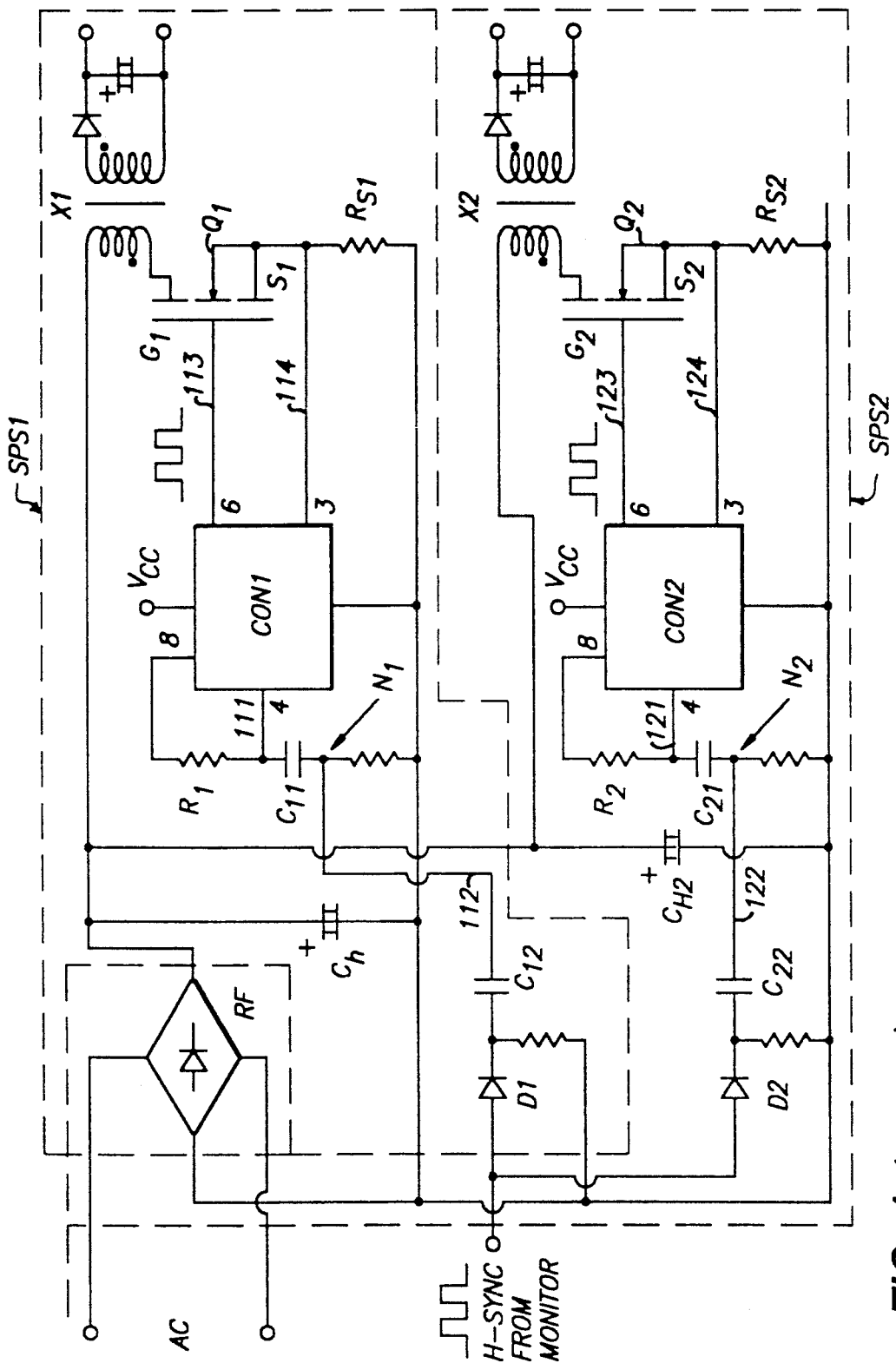
FIG. 1 shows a dual switching power supply circuit of the prior art.
Figure 2:
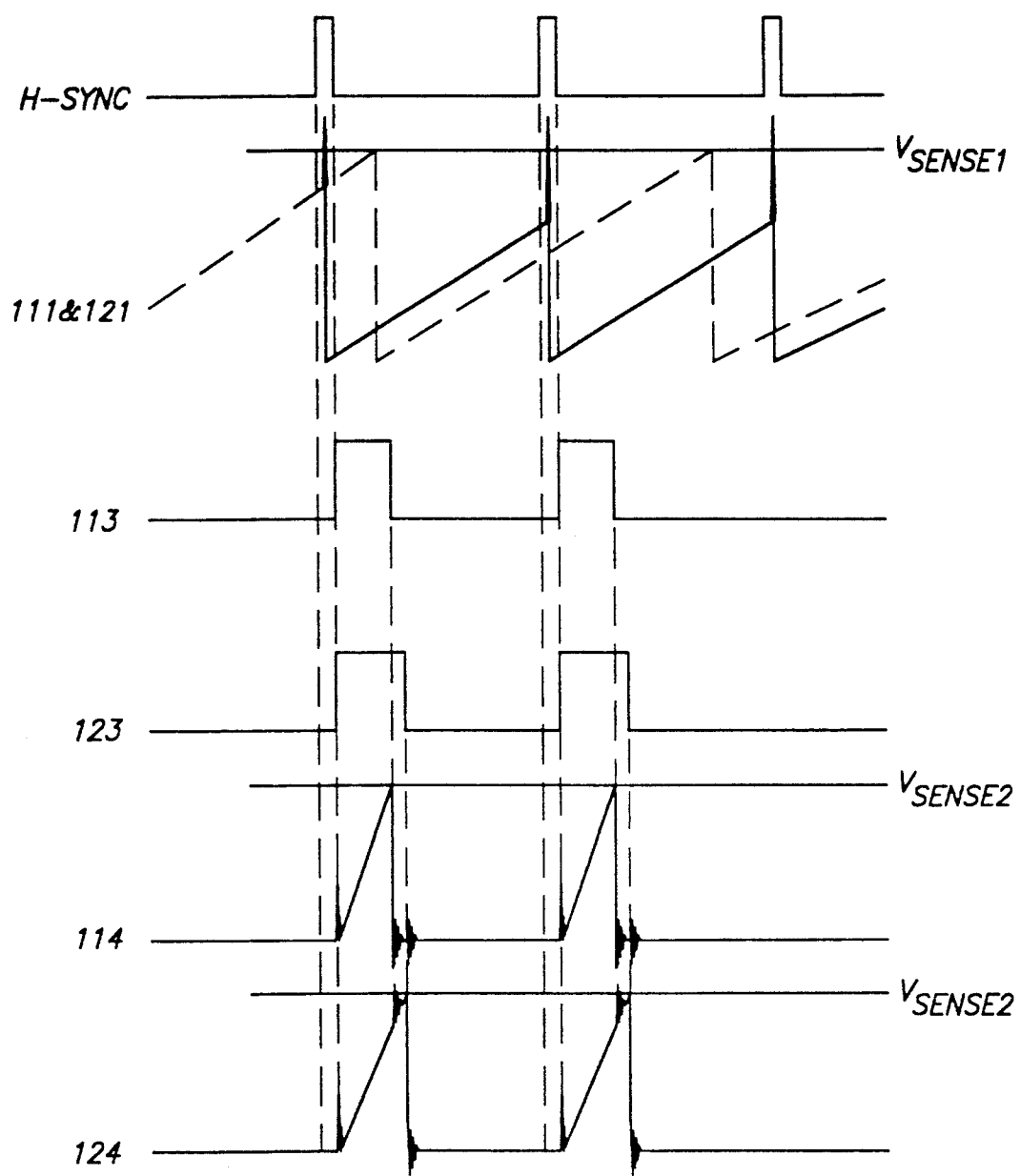
FIG. 2 is a timing diagram of the relevant signals in FIG. 1.
Figure 3:
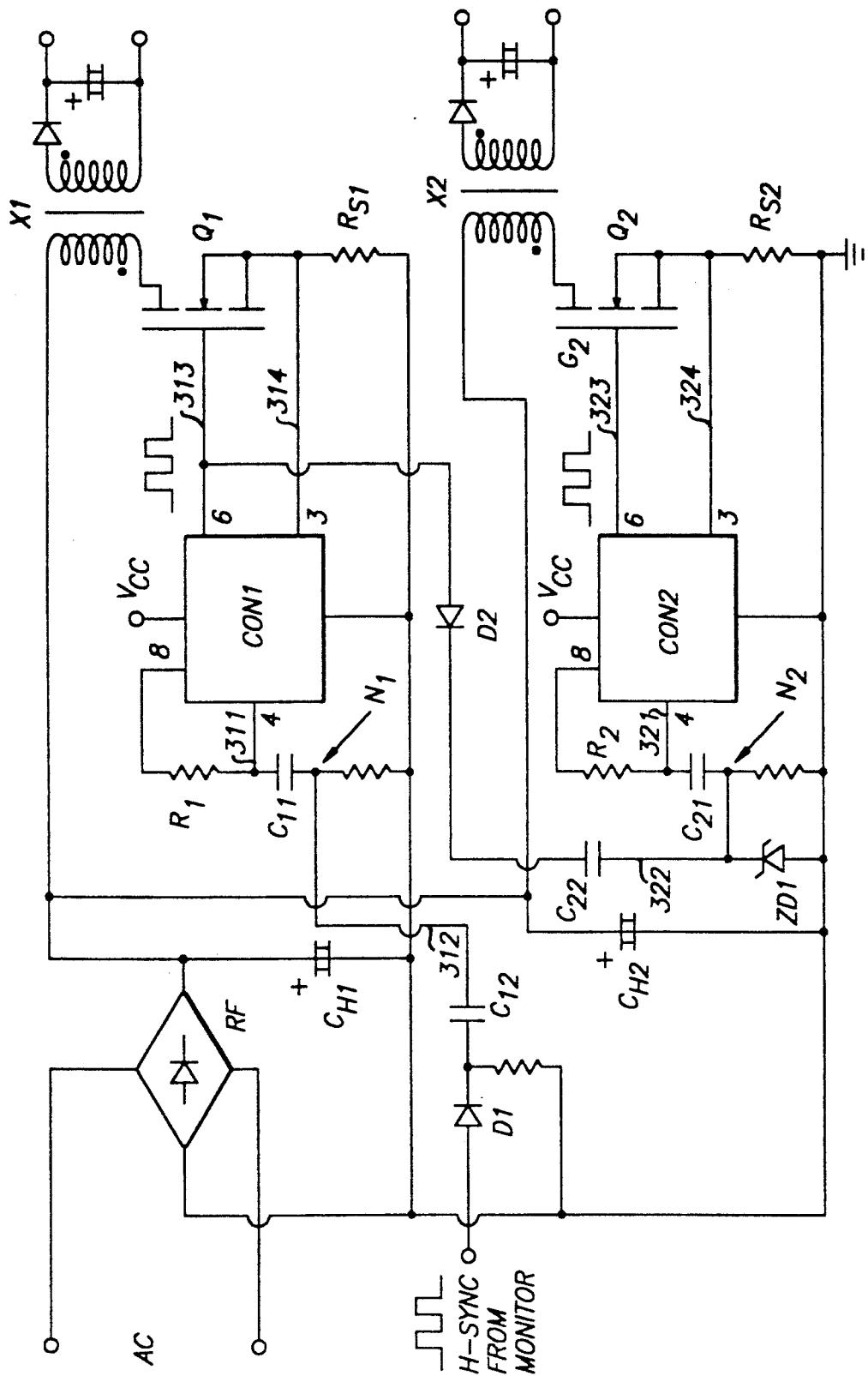
FIG. 3 shows the circuit of a first preferred embodiment of the invention.
Figure 4:
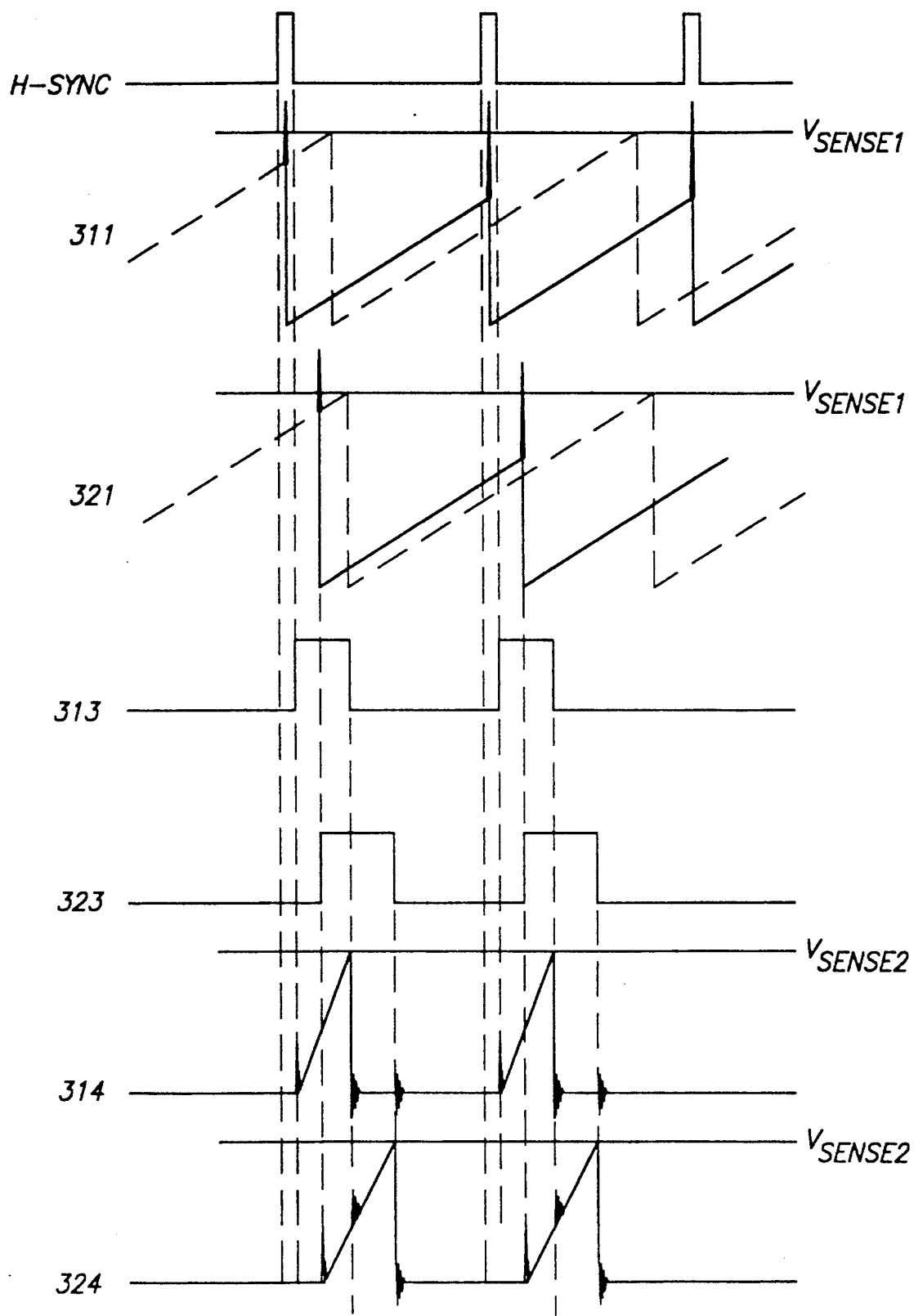
FIG. 4 is a timing diagram of the relevant signals in FIG. 3.

FIG. 3 illustrates a first preferred embodiment of the invention. SPS1 has essentially the same configuration as the SPS1 in FIG. 1. However, SPS2 does not input the h-sync signal from the monitor as the synchronization triggering signal as depicted in FIG. 1. Instead, it is coupled to pin #6 of CON1 and receives signal 313 as the synchronization triggering signal The zener diode $ZD_1$ is used to limit the voltage across $R_2$ so that the high voltage of the differentiated pulse will not damage the control IC CON2. The system works basically the same way as the prior art of FIG. 1 except that because the synchronization triggering signal for SPS2 is taken from the switch control pulse signal 313 of SPS1 instead of the h-sync signal, due to the propagation delay of the circuits in SPS1, the triggering of synchronization for SPS2 is later than that for SPS1. The square wave signal 323 also remains "low" until some time after signal 313 has gone to "high". Thus the phase of signal 323 is shifted to be later than that of signal 313. From the timing diagram of FIG. 4, it can be seen that because of the phase difference between the two switch control signals, the off noise of signal 314 coupling onto the slope portion of signal 324 does not make the resultant amplitude of signal 324 exceed the voltage limit $V_{sense2}$, therefore signal 323 is not pulled low too early, and the dual switching power supply system works normally. The amount of delay time required depends on the amplitude of the off noise and the difference of on-time durations of the two switch control signals.

Figure 5:
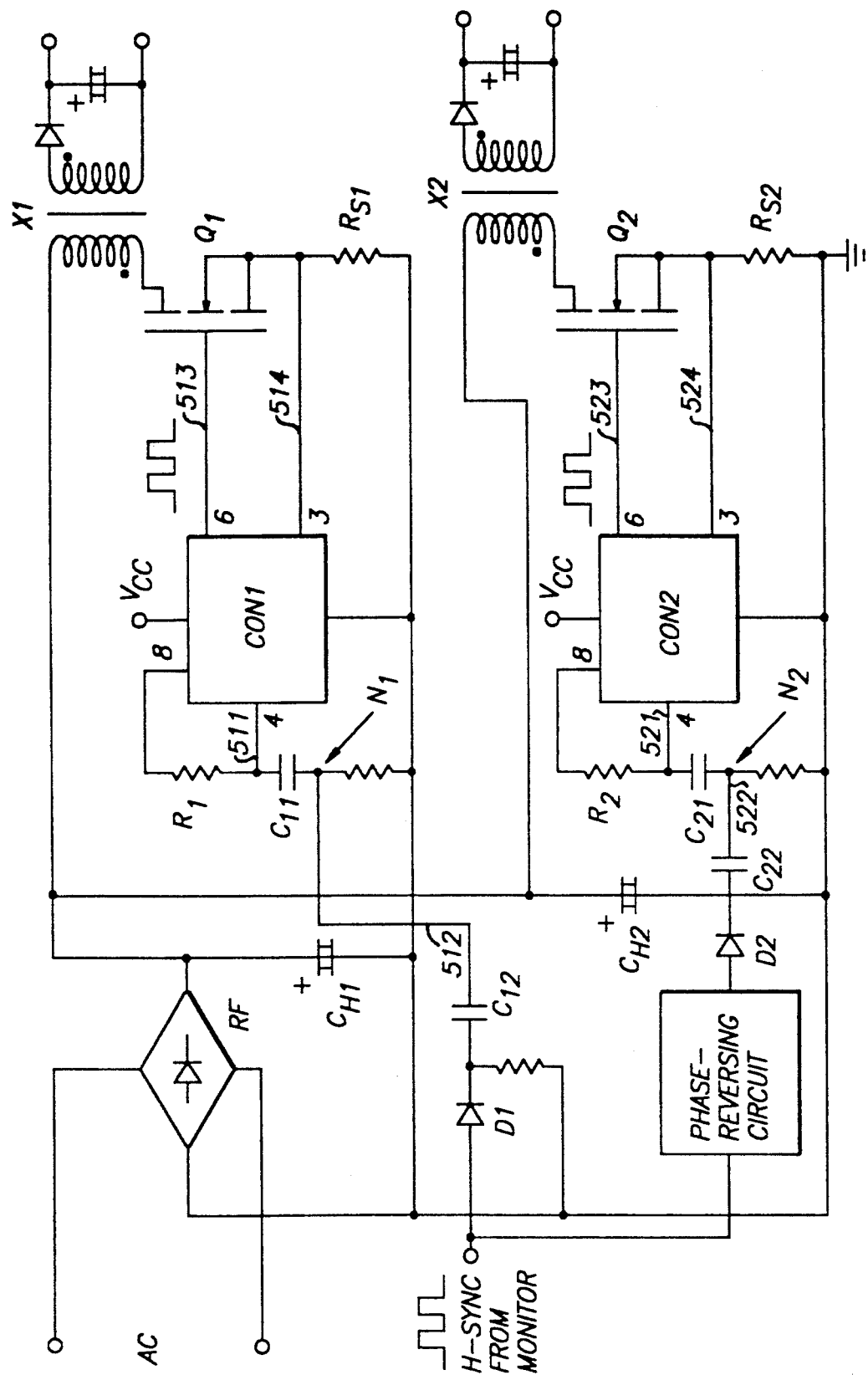
FIG. 5 shows the circuit of a second preferred embodiment of the invention.
Figure 6:
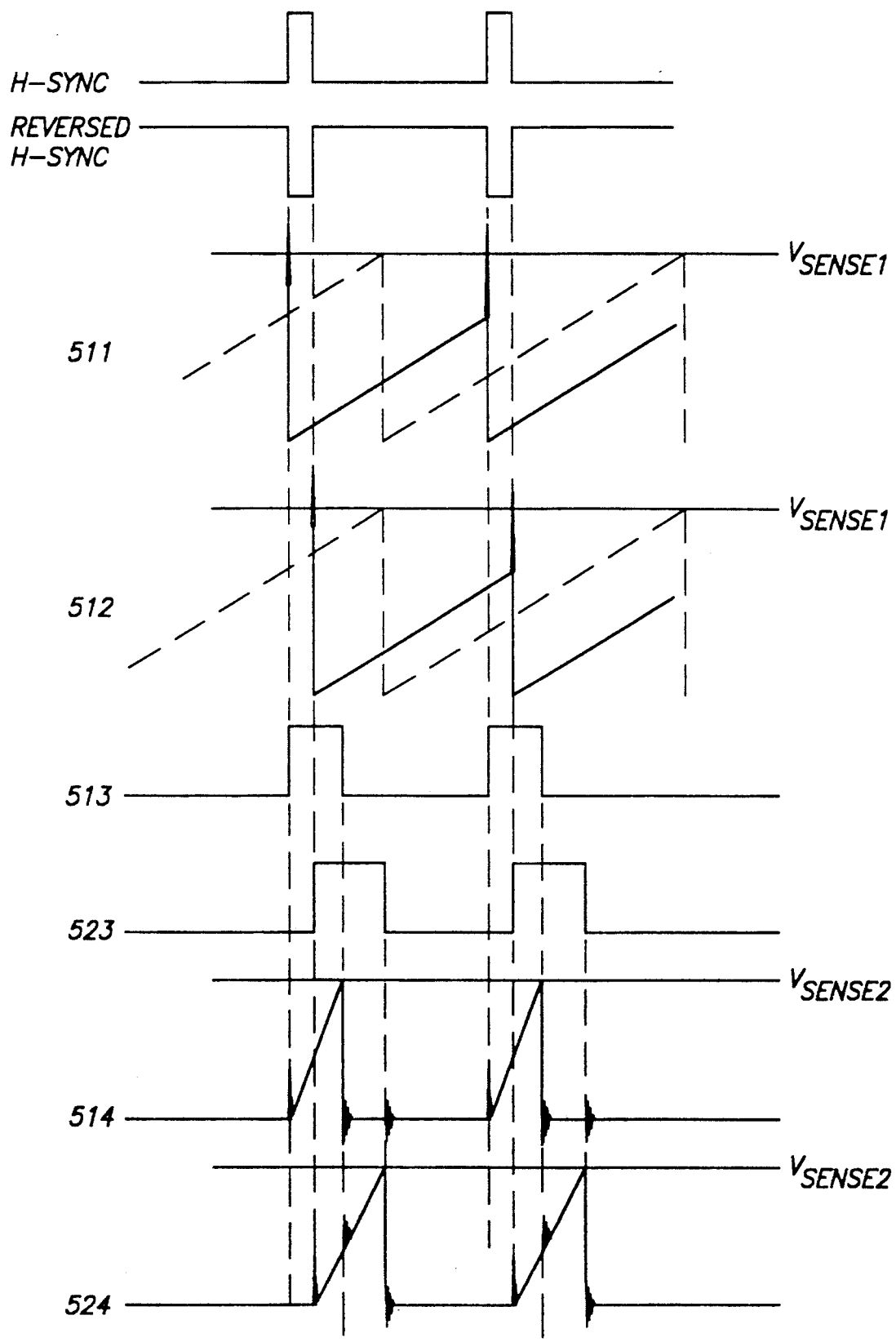
FIG. 6 is a timing diagram of the relevant signals in FIG. 5.

Referring to FIG. 5, a second preferred embodiment of the invention is presented. The second synchronization triggering signal is now a phase-reversed version of the h-sync signal from the monitor. Because of the rising edge triggering scheme of the synchronization process, signal 523 is later than signal 513 in phase by a pulse width. This implements the phase delaying function of the invention and prevents the malfunction inherent in the prior art from happening. FIG. 6 shows the corresponding waveforms of the second preferred embodiment.

Other embodiments can also be permissibly achieved by placing a delay circuit between the input synchronization signal h-sync and the second synchronization triggering input terminal, i.e. the anode of diode $D_2$, to obtain the appropriate amount of phase shift at the second switch control signal. As a result, the goal of avoiding the interference is accomplished.

Although the above provides a full and complete description of the preferred embodiments of the present invention, various modifications, alternate constructions and equivalents may be employed while remaining within the scope of the invention. Therefore, the above description and illustrations should not be construed as limiting the scope of the invention which is defined by the following claims.

What is claimed is:

1. A dual switching power supply system having first and second switching power supply means, comprising:
    a first switch control means which outputs a first switch control signal for turning the first switching power supply means on and off;
    a second switch control means which outputs a second switch control signal for turning the second switching power supply means on and off; and
    a differentiating circuit, coupled to both the first and second switching power supply means, for delaying the phase of the second switch control signal with respect to the first switch control signal by a predetermined amount while keeping the frequencies of the first and second switch control signals equal to each other, such that malfunction of the dual switching power supply system due to noise from the state changes of the first and second switch control signals is eliminated.

2. The dual switching power supply system of claim 1, wherein the first synchronization triggering signal is a horizontal synchronization signal of a monitor circuit.

3. The dual switching power supply system of claim 1, wherein the differentiating circuit comprises a capacitor, and one side of the capacitor receives the first switch control signal and the other side of the capacitor is coupled to a voltage sensing input terminal of the second switch control means.

4. The dual switching power supply system of claim 3, wherein the first synchronization triggering signal is a horizontal synchronization signal of a monitor circuit.

5. A dual switching power supply system having first and second switching power supply means, and receiving a first synchronization triggering signal, comprising:
    a first switch control means which outputs a first switch control signal for turning to the first power supply means on and off;
    a differentiating circuit for delaying the phase of the first synchronization triggering signal by a predetermined amount to generate a second synchronization triggering signal; and a second switch control means which outputs a second switch control signal in response to the second synchronization triggering signal for turning the second power supply means on and off, such that malfunction of the dual switching power supply system due to noise from the state changes of the first and second switch control signals is eliminated.

6. The dual switching power supply system of claim 5, wherein the first synchronization triggering signal is a horizontal synchronization signal of a monitor circuit.

7. A dual switching power supply system having first and second switching power supply means, and receiving a first synchronization triggering signal, comprising:
   a first switch control means which outputs a first switch control signal in response to the first synchronization triggering signal for turning the first power supply means on and off;
   a phase reversing means for reversing the phase of the first synchronization triggering signal to generate a second synchronization triggering signal which has a frequency equal to that of the first synchronization triggering signal; and
   a second switch control means which outputs a second switch control signal in response to the second synchronization triggering signal for turning the second power supply means on and off, such that malfunction of the dual switching power supply system due to nose from the state changes of the first and second switch control signals is eliminated.

8. The dual switching power supply system of claim 7, wherein the first synchronization signal is a horizontal synchronization signal of a monitor circuit.

9. A method of providing switch control signals in a dual switching power supply system, the dual switching power supply system having first and second switching power supply means, a first switch control means which outputs a first switch control signal and a second switch control means which outputs a second switch control signal, comprising the steps of:
   generating the first switch control signal for turning the first power supply means on and off;
   providing a differentiating circuit for selecting a predetermined delay time; and
   generating the second switch control signal in response to the first switch control signal by the predetermined delay time for turning the second power supply means on and off, with the frequency of the second switch control signal equal to the frequency of the first switch control signal, such that malfunction of the dual switching power supply means due to noise of the state changes of the first and second switch control signals is eliminated.

10. A dual switching power supply system having first and second switching power supply means, comprising:
    a first switch control means which outputs a first switch control signal for turning the first power supply means on and off, the first switch control means having a first voltage sensing terminal which receives a first synchronization triggering signal through a differentiating circuit;
    a second switch control means which outputs a second switch control signal for turning the second power supply means on and off, the second switch control mans having a second voltage sensing terminal which receives a second synchronization triggering signal having the same frequency but opposite phases as the first synchronization triggering signal; and
    a phase reversing means for reversing the phase of the first synchronization triggering signal to generate the second synchronization triggering signal while keeping the frequencies of the first and second synchronization triggering signals equal to each other, the phase reversing means receiving the first synchronization triggering signal as its input and having its output coupled to the second voltage sensing terminal, such that malfunction of the dual switching power supply system due to noise from the state changes of the first and second switch control signals is eliminated.

11. The dual switching power supply system of claim 10, wherein the differentiating circuit comprises a capacitor, having one end coupled to the first voltage sensing terminal and the other end adapted to receive the first synchronization triggering signal.

12. The dual switching power supply system of claim 11, wherein the first synchronization triggering signal is a horizontal synchronization signal of a monitor circuit.

13. The dual switching power supply system of claim 10, wherein the first synchronization triggering signal is a horizontal synchronization signal of a monitor circuit.

* * * * *